(12) United States Patent
Huppe et al.

(10) Patent No.: US 11,816,419 B2
(45) Date of Patent: Nov. 14, 2023

(54) METHOD FOR SAVING DOCUMENTS IN BLOCKS

(71) Applicant: CODEXO, Neuilly-sur-Seine (FR)

(72) Inventors: Sébastien Huppe, Paris (FR); Marc Dangeard, Quimper (FR)

(73) Assignee: CODEXO, Neuilly-sur-Seine (FR)

( * ) Notice: Subject to any disclaimer, the term of this patent is extended or adjusted under 35 U.S.C. 154(b) by 0 days.

(21) Appl. No.: 17/782,608

(22) PCT Filed: Dec. 4, 2020

(86) PCT No.: PCT/HR2020/052288
§ 371 (c)(1),
(2) Date: Jun. 3, 2022

(87) PCT Pub. No.: WO2021/111095
PCT Pub. Date: Jun. 10, 2021

(65) Prior Publication Data
US 2023/0013179 A1   Jan. 19, 2023

(30) Foreign Application Priority Data
Dec. 5, 2019 (FR) ........................... 1913814

(51) Int. Cl.
*G06F 40/117* (2020.01)
*G06F 40/253* (2020.01)
*G06F 40/166* (2020.01)
*G06T 11/20* (2006.01)

(52) U.S. Cl.
CPC .......... *G06F 40/117* (2020.01); *G06F 40/166* (2020.01); *G06F 40/253* (2020.01); *G06T 11/206* (2013.01)

(58) Field of Classification Search
CPC .................................................... G06F 40/117
See application file for complete search history.

(56) References Cited

U.S. PATENT DOCUMENTS

| | | | |
|---|---|---|---|
| 5,841,900 A * | 11/1998 | Rahgozar et al. | G06K 9/34 |
| 10,049,270 B1 * | 8/2018 | Agarwalla et al. | G06K 9/00469 |
| 2002/0062325 A1 * | 5/2002 | Berger et al. | G06F 15/00 |
| 2004/0013302 A1 * | 1/2004 | Ma et al. | G06K 9/62 |
| 2008/0046441 A1 | 2/2008 | Wen et al. | |
| 2015/0205803 A1 * | 7/2015 | Agarwal et al. | G06F 17/3071 |

* cited by examiner

*Primary Examiner* — James J Debrow
(74) *Attorney, Agent, or Firm* — Kim & Stewart LLP

(57) ABSTRACT

It is provided a computer-implemented method for recording one or more documents. Each document comprises at least one word. The method comprises providing one or more documents forming a first set of documents. The method comprises dividing each document of the first set into one or more blocks. The method comprises creating a directed graph representing relationships established between the blocks of documents of the first set. The method comprises providing at least one block from a previous division of each document of a second set of documents. The method comprises merging the directed graph created for the first set with another directed graph previously created for the second set and taking account of at least one established relationship. The method improves the recording of the sets of documents.

19 Claims, 9 Drawing Sheets

BETWEEN

CODEXO, a company organized under the laws of France, having its registered office at 144 ave Charles de Gaulle, Neuilly-sur-Seine, registered with the Nanterre register of legal person under number 821610169, represented for the purposes and requirements hereof by Marc Dangeard in his capacity of President, hereinafter referred to as the "*Supplier*";

AND

ACME, a company organized under the laws of France, having its registered office at # adresse, ville, registered with the Ville register of legal person under number 123456789, represented for the purposes and requirements hereof by John Smith in his capacity of CEO, hereinafter referred to as the "*Contracting party*";

The Supplier and the Contracting party shall hereinafter be jointly referred to as the "*Parties*" or separately a "*Party*".

FIG. 1

BETWEEN A

CODEXO[a], a company organized under the laws of France[b] having its registered office at 144 ave Charles de Gaulle, Neuilly-sur-Seine[c], registered with the Nanterre[d] register of legal person under number 821610169[e], represented for the purposes and requirements hereof by Marc Dangeard[f] in his capacity of President[g] hereinafter referred to as the "*Supplier*";

AND C

ACME[a], a company organized under the laws of France[b] having its registered office at # adresse, ville[c], registered with the Ville[d] register of legal person under number 123456789[e], represented for the purposes and requirements hereof by John Smith[f] in his capacity of CEO[g] hereinafter referred to as the "*Contracting party*";

The Supplier and the Contracting party shall hereinafter be jointly referred to as the "*Parties*" or separately a "*Party*".

FIG. 2

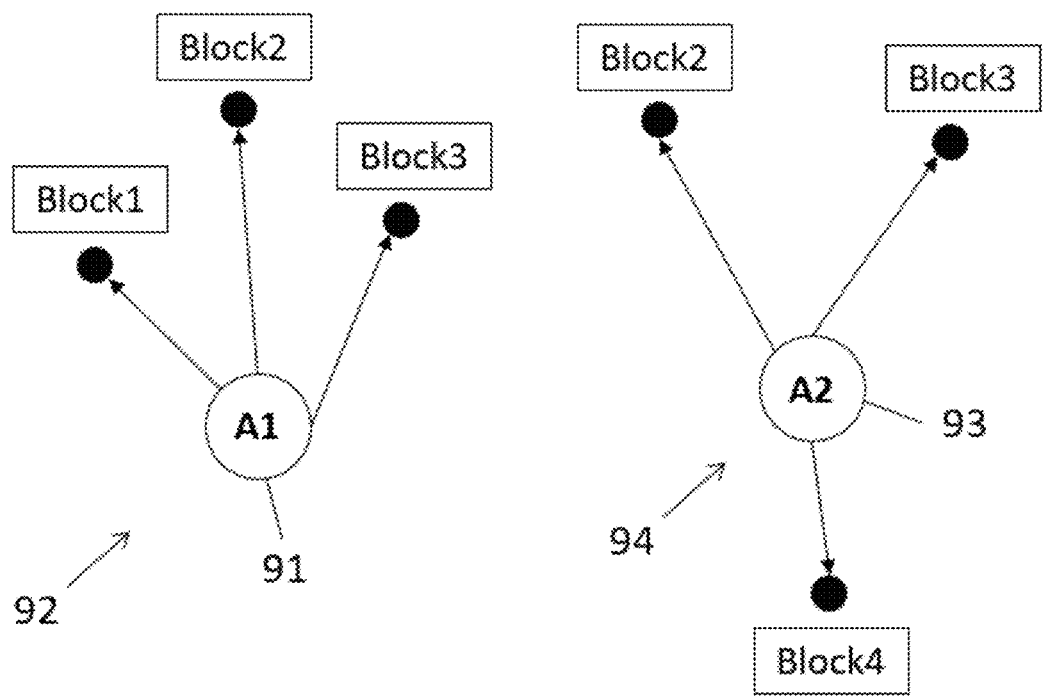
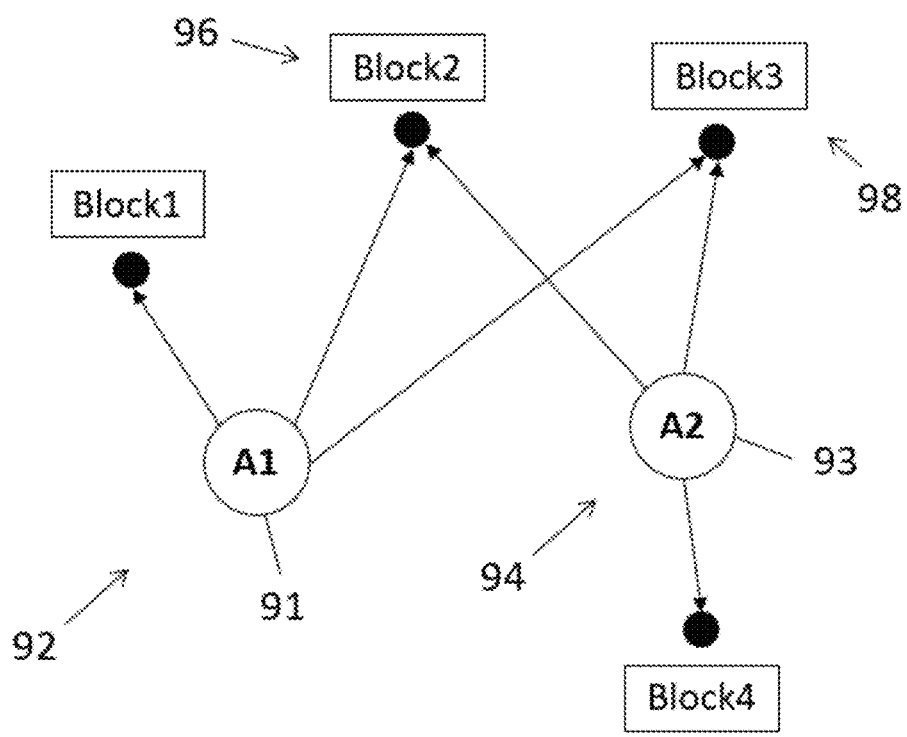
FIG. 7

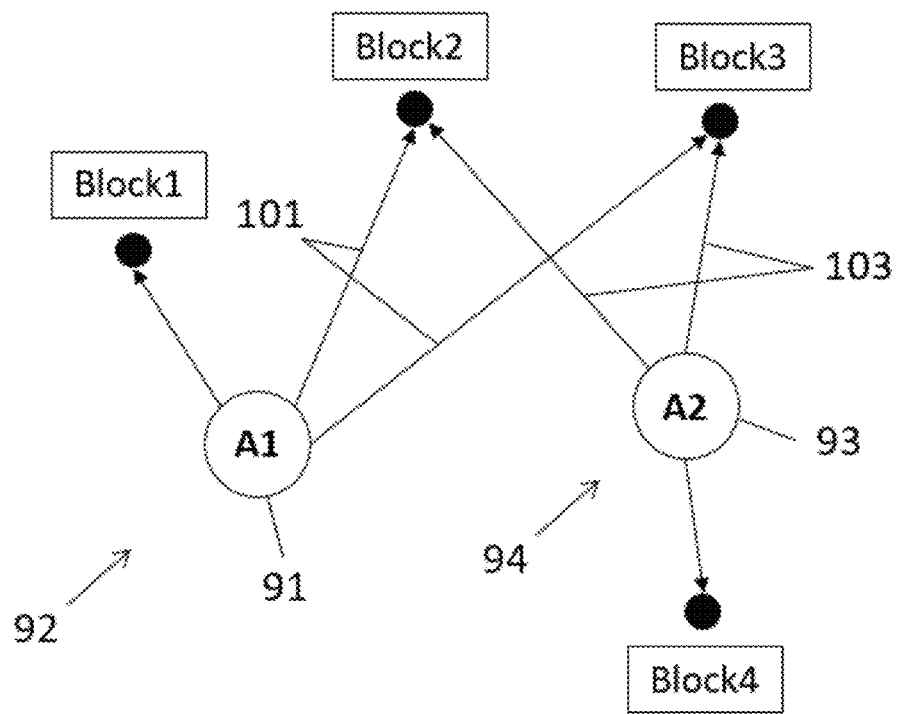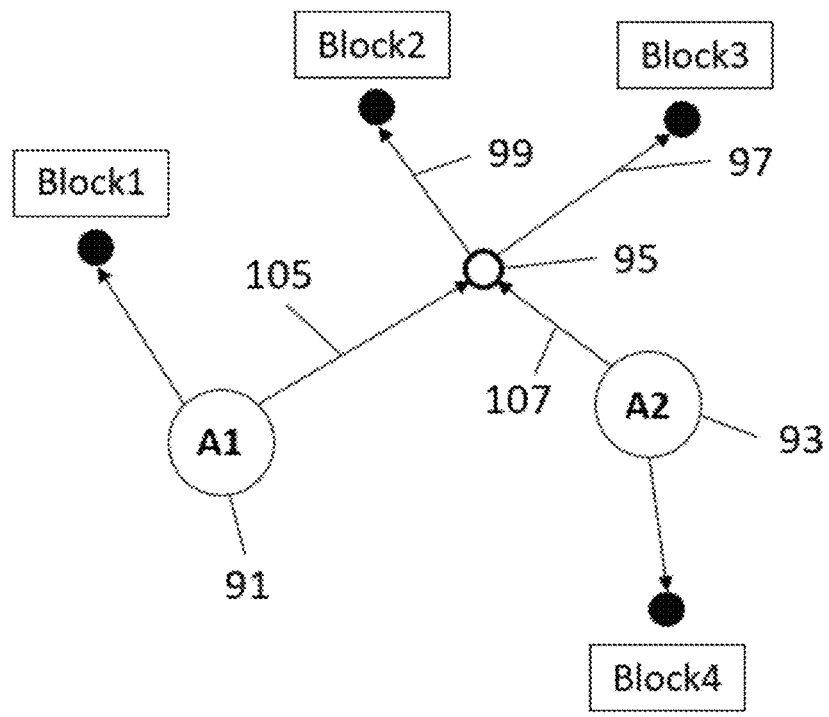
FIG. 8

METHOD FOR SAVING DOCUMENTS IN BLOCKS

The present disclosure relates to recording and recovering documents.

Companies and administrations generally use sets of documents grouped together by themes. In order to improve the management of the sets of documents, companies generally record these sets of documents by computer. One solution generally used consists in recording the sets of documents in respective directories according to a classification defined beforehand. In such a solution, the documents are generally recorded in a format of the PDF (Portable Document Format) type or of an editable type (for example using word processing software such as Microsoft Word). For example, a company that supplies household products may use sets of documents of the "instruction manual" type by respective product families.

One limitation of this recording solution relates to the memory space used. Indeed, each document is recorded independently of the others in this solution and there are no links between the documents of the same set, even when the documents share commonalities. For example, the successive versions of an instruction manual are stored separately, such that the storage space used increases as versions of the same instruction manual are stored. For a company supplying household goods, for example, documents of the "instruction manual" type may comprise sections of text that are similar by product family. Another limitation relates to the use of the sets of documents. Since the recording is devoid of links between the documents, it is not possible to use the existing links between the documents in the same set when consulting or publishing documents.

In this context, there is a need to improve the recording of a set of documents.

To this end, it is provided a computer-implemented method for recording one or more documents. Each document comprises at least one word. The method comprises providing one or more documents forming a first set of documents. The method comprises dividing each document of the first set into one or more blocks. Each block comprises at least one word. The method comprises establishing one or more relationships between blocks of documents of the first set. The method comprises creating a directed graph representing the relationships established between the blocks of documents of the first set. The method comprises providing at least one block from a previous division of each document of a second set of documents. The method comprises establishing at least one relationship between the blocks of the documents of the first set and the blocks of the documents of the second set. The method comprises merging the directed graph created for the first set with another directed graph previously created for the second set and taking account of the at least one established relationship.

The method improves the recording of the sets of documents.

In fact, the method allows the documents of the first set of documents to be recorded with the documents of the second set of documents by taking into account the links between the documents of the sets. To this end, the recording comprises merging the directed graph created from the first set with the other directed graph created for the first set. Merging the graphs improves the use of the recorded documents by connecting the documents of the sets with one another. Thus, the method improves the recording of one or more documents of the first set with the documents of the second set.

The documents are divided into blocks comprising at least one word. Recording the documents in blocks allows extraction of the information on the documents during recording. In fact, a document is generally structured, and recording in blocks allows this document structure to be used. In particular, the documents of a set may have a similar structure. The divided blocks of the documents allow the creation of the directed graph, which thus represents the blocks of the documents of the set and the links existing between the blocks, and therefore the documents, of the set. Thus, the division into blocks and the creation of the directed graph improves recording.

The method comprises merging the directed graph of the first set and the directed graph of the second set from the established relationships. This improves the recording by reducing the memory space used for recording. In fact, the division into blocks allows the establishment of relationships between the blocks of the two directed graphs, and in particular the identification of similar blocks. Merging the graphs reduces the storage space by merging the similarities between the directed graphs, and therefore the sets of documents, identified during the establishment of the relationships between the blocks. Thus, merging the directed graphs improves recording by reducing the memory space used for recording.

Dividing each document of the first and/or of the second set may comprise identifying one or more marks on the document. Dividing each document of the first and/or second set may comprise dividing the document into blocks, each block starting from a mark.

The marks identified in the document may be at least one selection among a section change indicator, a carriage return, a punctuation mark, a word, a space and/or a character.

Establishing the relationships between the blocks may comprise, for each pair of blocks, a calculation of the distance between the blocks of the pair to determine the similarity between the two blocks.

Determining the similarity may further comprise identifying at least one block parameter out of the pair of blocks, a parameter representing a different word in the two blocks.

Creating the directed graphs may comprise providing an elementary directed graph for each document. The elementary directed graph may comprise a root node associated with the document, a node associated with each block identified in the document and a directed arc connecting the root node to each node associated with a block. The creation of the directed graph may comprise merging blocks having a significant similarity score.

Creating the directed graph may further comprise at least one creation of an intermediate node. The creation of an intermediate node may comprise identifying a group of blocks of at least two merged blocks between at least two documents, creating directed arcs between the intermediate node and each block of the identified group of blocks and, for each of the at least two documents, merging the directed arcs of the directed graph of the document that are associated with the blocks of the group of blocks into a single directed arc connecting the root of the document and the intermediate node.

The elementary directed graph of each document may further comprise, for each directed arc, an association of a value representing the position of the block among the other blocks in the divided document.

Establishing one or more relationships between the blocks of the documents of the first and/or of the second set may further comprise approving by a user at least one relationship.

The approving by a user of the established relationships may comprise displaying to the user of the relationships in an order depending on a similarity score, preferably from the high score to the smallest similarity score, and approving or rejecting the link by the user upon each displayed relationship.

It is also provided a database. The database may comprise a recording of one or more documents according to the described method for recording.

It is also provided a method for reconstructing a document recorded according to the described method for recording and in which a value representing the position is associated with each directed arc. The method for reconstructing comprises providing a directed graph resulting from the merging, selecting the root node associated with the document of the provided graph, identifying the blocks of the document following the directed arcs and assembling the identified blocks in the order of the values associated with each directed arc.

The identification of the blocks of the document following the directed arcs may comprise running through a set of paths following the arcs of the directed graph starting from the arcs connected to the root of the document, identifying a block of the document when a path connects the block and the root of the document following the orientation of the arcs, and stopping the run-through of a path when the orientation of an arc on the path is contrary.

It is also provided a computer program comprising instructions for carrying out the described computer-implemented method for recording one or more documents, and/or the described method for reconstructing a recorded document.

It is also provided a computer-readable storage medium on which the computer program is recorded.

It is also provided a system comprising a processor coupled to a memory and a graphic user interface. The computer program is recorded on the memory.

Non-limiting examples will be described in reference to the following figures:

FIG. 1 shows an example document;

FIG. 2 shows the example of the document of FIG. 1 divided into blocks;

FIG. 7 shows an example of merging of blocks;

FIG. 8 shows an example of creation of an intermediate node; and

Figure 3:
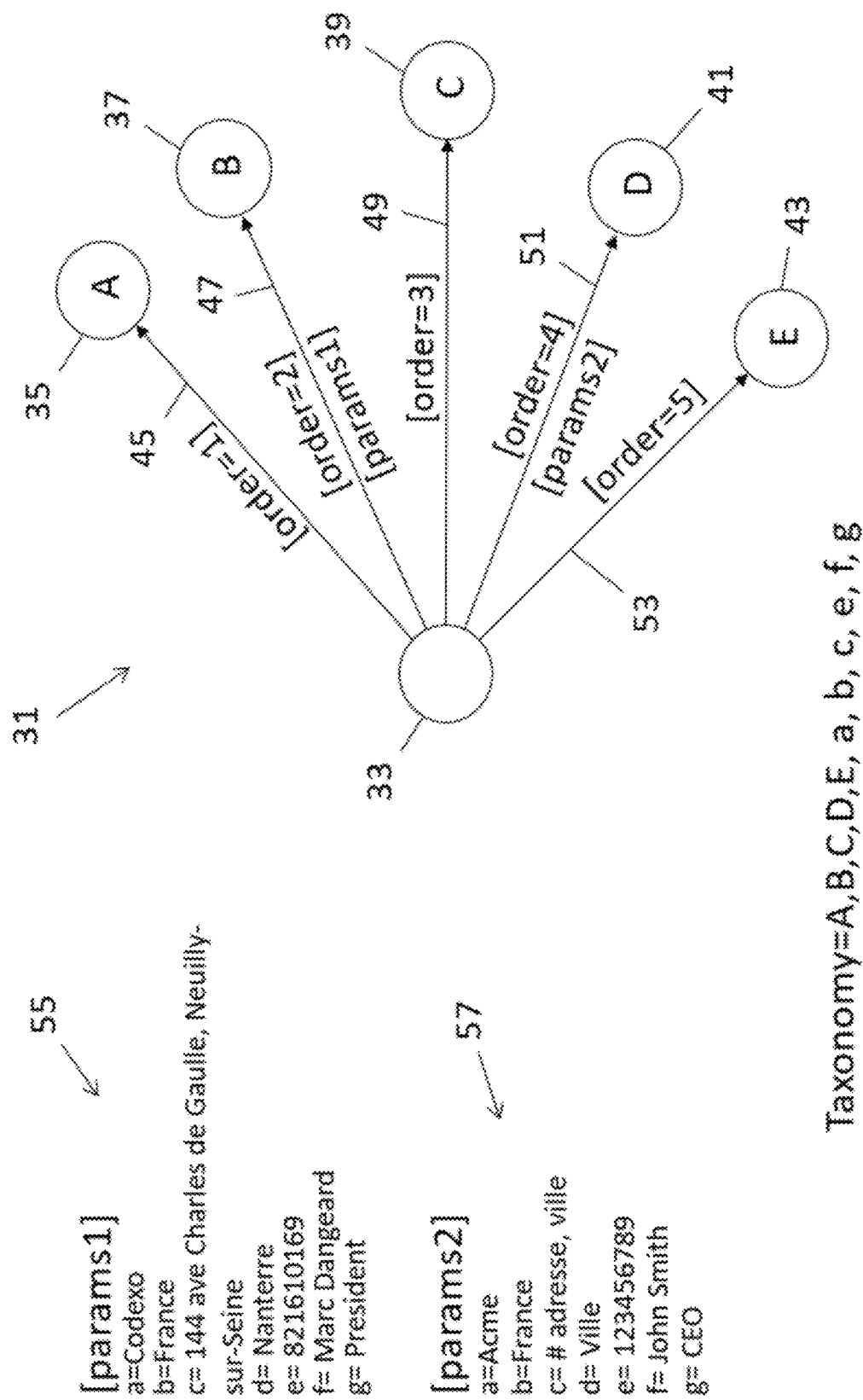
FIG. 3 shows an example of an elementary directed graph of the example of FIG. 1.

In the present disclosure, a word is a group of one or more characters, considered to be an entity. A character is a graphic sign of a writing system, and may be a letter, a number or any other element of a text (for example a "@"). Thus, a word may be a single character (for example "a" or "I"), a series of characters (for example "table"), several series of characters having a logic relative to one another (for example "coffee table"), a date ("Nov. 12, 2019") or any other group of characters forming an entity.

A document is a set of words assembled on a medium and forming information. The set of words may comprise one or more words. A document may form any type of information (for example such as technical information). For example, a document may be a technical specification for a mechanical part, an industrial standard or an "instruction manual" notice for a product.

In the present disclosure, a document is a computer document, that is to say, a file recorded on a computer medium (such as for example, but not limited to, a volatile memory, a non-volatile memory, a storage server) and which may be viewed/edited digitally (for example using a computer). Recording a document is the operation consisting in recording the document on a computer medium. A document can be recorded in a recording format different from that of the present disclosure. For example, a document can be recorded in a PDF-type format or in an editable-type format (for example by a word processing software application such as Microsoft Word). It will be understood that the format used to store the document is of little importance and that the examples given are provided solely as an illustration.

A document comprises a set of at least one word forming the text of the document. A document may also comprise one or more tables and/or one or more images. The text of the document may comprise paragraphs. The paragraphs may comprise one or more phrases made up of words. The paragraphs of the text may form sections. The sections may comprise titles.

A block of a document comprises a set of one or more consecutive words in the text of the document, potentially separated by punctuation elements. A block may comprise a single word, a plurality of words separated by punctuation elements, or one or more consecutive phrases of the text. A block may be a block of content. A block of content may comprise a word, a number, a phrase, a paragraph or an image. A block may also be a structural block. A structural block may comprise structural elements of the text of the document. For example, a structural block may comprise the sections and/or the section titles of the text. The structural blocks allow the content of the document to be organized into subsets, for example such as subparagraphs or tables.

The method comprises providing one or more documents forming a first set of documents. The first set may be a set of documents around the same theme, or containing information of the same order. The theme of the set is a set of subjects or topics addressed in the content of the documents of the set. For example, a theme may be the use of technical equipment, regulations in terms of manufacturing equipment, or energy consumption of a set of establishments. The one or more documents may be present in a directory of a computer medium recorded in an initial memory space, and in the form of a set of files. The provision of the documents of the first set may comprise selecting one or more documents in the directory. For example, the selection may comprise a user designating the files of one or more documents among the set of files in the directory. The provision of the documents may comprise downloading documents in a dedicated memory space. Alternatively, the provision of the documents may comprise recording paths pointing to the files of one or more documents in the initial memory space.

The method comprises dividing each document of the first set into one or more blocks. The division consists in splitting the set of documents into blocks. Through the division, each document of the set is split into one or more blocks. The blocks thus form the set of parts of each document. Each obtained block can form a file able to be stored separately from the other files forming each block. The division may comprise a division of the text of each document. For example, the division may comprise dividing the text from the paragraphs of the text. Each block may comprise a paragraph of the text. Thus, the set of blocks may correspond to the set of paragraphs of the text of the document. The division may comprise recording blocks on a computer medium. Alternatively, the division may comprise replacing each document, on the computer medium, by the set of blocks formed after division.

The method comprises establishing one or more relationships between the blocks of the documents of the first set. A relationship is an identified link between blocks from the content of these blocks. The link between two blocks is established based on a degree of similarity between the two blocks. Thus, the relationship is an identification of a similarity between the content of the blocks. Establishing the relationships may comprise comparing each possible group of blocks of the set to one another. Establishing the relationships may comprise recording the established relationships on a computer medium. Recording a relationship may comprise recording identifiers of the blocks of the relationship and a link between these identifiers.

The method comprises creating a directed graph representing the relationships established between the blocks of the documents of the first set. The directed graph is a graphic representation of the set of documents from the blocks of the set and the relationships established between the blocks. The orientation of the graph may correspond to the membership of a block in a document. The directed graph may be a graphic representation in tree form comprising nodes and branches between pairs of nodes. Nodes of the tree may correspond to the blocks. Branches of the tree may correspond to the relationships established between blocks. For example, branches may correspond to the relationships established between pairs of blocks.

The method comprises providing at least one block from a previous division of each document of the second set of documents. The second set is a set recorded according to the same method. The second set comes from a previous record. During this previous record, another directed graph was created for the second set. The provision may comprise selecting the at least one block of the second set. For example, the selection may comprise a user designating the at least one block on the directed graph of the second set. The at least one block may for example be a single block of the second set or all the blocks of the second set.

The method comprises establishing at least one relationship between the blocks of the documents of the first set and the blocks of the documents of the second set. The establishment of the relationships may be similar to the establishment of the relationships previously described for the relationships between the blocks of the first set. Establishing the relationships may comprise comparing the set of blocks of the first and the second sets to one another in order to identify links between the contents of the blocks. Thus, establishing the relationships allows the documents of the first set and the second set to be connected to one another.

The method comprises merging the directed graph of the first set with the directed graph of the second set. The merging may comprise creating a new directed graph resulting from the merging of the directed graph of the first set and the directed graph of the second set. The graphs are merged from the at least one relationship established between the blocks of the first set and the second set. For example, the merging may comprise creating a new directed graph by juxtaposing the two directed graphs and in which the blocks for which a relationship has been established are superimposed. The superposition may comprise deleting the superimposed blocks from the memory (in which the blocks are recorded). Thus, merging the directed graphs allows the memory space occupied on the computer medium by the record to be reduced. The redundant information (the blocks identified as for example having a high similarity) is no longer stored as a result of the merging of the two directed graphs. In a highly simplified case, for example, the first set may comprise a document comprising the blocks "toto" and "tata" and the block of the second set may be "tata." Thus, the record will comprise merging the "tata" blocks of the two sets, and therefore a single recording of the "tata" block for the two sets, whereas this was previously recorded twice (once for each set). The example described here is highly simplified and a document generally contains several hundred words. This allows a large number of relationships to be established, which greatly reduces the memory space used. This is even more true when the documents of the sets belong to a same theme.

The merging of the graphs also allows the recorded documents to be used via the identified links, via the identified relationships, between the documents of the first set and the second set relative to one another. For example, the identified links allow viewing of the similarities between the documents, requests on the content of the documents, or studying of the differences between the documents. In particular, the method may comprise a display of the directed graph resulting from the merge.

The dividing of each document of the first and second set may comprise identifying one or more marks on the document. The division may comprise dividing the document into blocks, in which each block may start from a first mark identified on the document and stop at a second mark identified on the document. For example, if the document comprises N marks, the first block is comprised between the first mark and the second mark, the second block is comprised between the second mark and the third mark, the Pth block is comprised between the Pth mark and the P+1st mark, and so forth. Identifying the marks on the document may comprise running through the text of the document to identify the marks. The document may be run through in the reading direction, for example from left to right and from top to bottom. The marks identified in the document may be at least a selection among a section change indicator, a carriage return, a punctuation mark (for example a period, a semicolon, an exclamation mark, a question mark, etc.), a word, a space and/or a character. The run-through to identify the one or more punctuation marks may comprise comparing, during the run-through of the document, the text being run through with the selection of marks.

The dividing of the document into blocks improves the recording. In particular, the marks identified for the division are structural indicators of the document, that is to say, how the document is organized, and the division into blocks using marks allows extraction and use of this organization, which may be shared and/or similar between the documents. Thus, the division with identified marks guarantees coherence in the content of the divided blocks, but also in the organization of the blocks relative to one another. The division into blocks thus the organization of each document to be extracted and used during recording. This structural information is in particular used again when establishing relationships between the blocks. This allows the directed graph to link the documents to one another, in particular taking their structure into account.

The establishing of the relationships between the blocks may comprise, for each pair of blocks, calculating a distance between the blocks of the pair to determine the similarity between the two blocks. The distance represents the similarity of the content of the two blocks of the pair. Thus, the distance represents the similarity between the words contained in the blocks of the pair. Calculating the distance may provide a similarity score representing the similarity between the content of the blocks of the pair. Calculating the distance may comprise comparing the at least one word of the first block of the pair with the at least one word of the second block of the pair. For example, calculating the distance may comprise identifying similar words in the two blocks. Calculating the distance may also comprise identifying words having a close meaning in the two blocks. The distance may represent the degree of precision and/or similarity of meaning of the words contained in the pair of blocks. Calculating the distance may in particular take into account the position of the words in the blocks and the successive sequencing of the words in the block.

The calculating of the distance improves the recording of the documents. In fact, calculating the distance allows the similarity of the blocks to be determined from the words they comprise. Determining the similarity improves recording by adding this similarity information between the blocks to the recording. The similarity in particular allows better management of the memory space used by deleting information that is recorded several times, for example when documents contain identical blocks. Thus, this reduces the memory space used by the recording.

The determining of the similarity may further comprise identifying at least one block parameter on the pair of blocks. A block parameter may represent information that is common to the two blocks, but with a different value. For example, the two different values may be a different word in the two blocks. The at least one parameter may be recorded during merging of the two graphs, at each document. For example, the parameter may be recorded at the directed arcs connecting the root node of the document and the corresponding block. The value of the parameter may be the chain of characters of the different word in the two blocks. The chain of characters of the different word in the two blocks may be a word for example representing a noun, a location, a date or a number corresponding to an amount.

The identifying of parameters improves the recording, that is to say, the quantity of memory space used to store an identical quantity of information decreases. In fact, identifying parameters provides a representation of common elements between two or more blocks, but which may have a different value between the blocks, and thus facilitates the comparison of the blocks. For example, if a parameter is "date," a value of the "date" parameter may be the date Jan. 29, 2020 in a first block, and Feb. 29, 2020 in a second block. The value of the "date" parameter then represents a specificity of each of the blocks. This specificity in a way identifies the block, and by extension the document, which allows the comparative study of the documents of the set to be simplified. Thus, the recording enhances the study of the document. Identifying parameters also improves the memory space used by the record. In fact, recording distinctive parameters allows a reduction in the memory space used with only the distinctive information (of the identified parameter) of the blocks for which a relationship is established with another block being placed in memory.

The creating of the directed graph may comprise providing an elementary directed graph for each document. The elementary directed graph may comprise a root node associated with the document. The elementary directed graph may further comprise a node associated with each block identified in the document. The elementary directed graph may further comprise a directed arc connecting the root node to each node associated with a block. Creating the directed graph may comprise merging blocks having a significant similarity score. Merging is a superposition of similar blocks in the directed graph. Providing an elementary directed graph may comprise creating elementary directed graphs during the provision of the documents. Alternatively, providing an elementary directed graph may comprise selecting elementary directed graphs when they have been created beforehand. The directed arcs connecting the root node to the nodes associated with the blocks may comprise the respective parameters identified during the establishment of the relationships on these blocks.

The merging of the blocks having a significant similarity score improves the recording. In fact, the merging reduces the space used by the memory on the computer medium by deleting the duplicate information by superposition.

The creating of the directed graph may further comprise at least creating an intermediate node. Creating an immediate note comprises identifying a group of blocks of at least two merged blocks between at least two documents. Creating an intermediate node comprises creating directed arcs between the intermediate node and each block of the identified group of blocks. Creating an intermediate node comprises, for each of the at least two documents, merging directed arcs of the directed graph of the document that are associated with the blocks of the group of blocks in a single directed arc connecting the root of the document and the intermediate node. The parameters comprised on the merged directed arcs can then be distributed on the new created network of directed arcs containing the intermediate node as a function of the blocks and the new created network of directed arcs.

An intermediate node represents a similarity of several blocks between two documents. Thus, creating an intermediate node allows the extraction of additional comparative information from the documents of the set. Creating an intermediate node in particular allows identification of the similar groups of blocks between two documents directly on the directed graph. This thus improves the recording of the documents. Creating an intermediate node also reduces the memory space used. In fact, merging the directed arcs toward the intermediate node allows a reduction in the number of arcs of the directed graph, and therefore the memory space used.

The elementary directed graph of each document may further comprise, for each directed arc, the association of a value representing the position of the block among the other blocks in the divided document. For example, the value may be a number indicating the position of the block in the document relative to the other blocks. Thus, a value 1 may be associated with the arc directed toward the first block of the document. Likewise, a value n may be associated with the arc directed toward the last block of the document (n then being the number of blocks in the document).

The association with a value representing the position of the blocks in the document improves the recording of the document. In fact, this gives the order of appearance of the block in the document during an initial reconstruction (i.e., before division) of the document. Thus, no information is lost during the division of the documents and they can be reconstituted. This in particular allows verification of the integrity of the record from the reconstitution of the documents.

The establishing of one or more relationships between the blocks of the document of the first set and/or of the second set may further comprise approving by a user at least one relationship. The approving is an approval of the similarity between the blocks identified during the establishment of the relationships. The approving by the user of the established relationships may comprise displaying to the user of the relationships. The displaying to the user may be in an order depending on a similarity score between the blocks of the considered relationship. The displaying order may for example correspond to a displaying to the user of relationships starting with the one having the highest score. The relationships may next be displayed to the user according to a decreasing order of similarity score. For each relationship resented to the user, the approving may comprise approving or rejecting the link for each displayed relationship. The displaying comprises a simultaneous display of the blocks of the relationship to the user, for example on a screen. The simultaneous display may comprise displaying the parameters identified on the blocks. The display may also comprise icons, selectable by the user, and corresponding to the approving or rejecting of the link for each displayed relationship.

The approving of the relationships enhances the relevance of the created directed graph. Indeed, the approving allows the accuracy of the established relationship to be verified.

It is also provided a database comprising a backup of one or more documents according to the described method for recording. The database is a structured container for the backup of the documents. The database may contain the backup in part or in whole. The database is recorded on a computer medium (for example, a memory or a server). The database may comprise the set of blocks. The database may comprise the directed graph resulting from merging the directed graphs of the first set and the second set. The database may comprise the established relationships. The database may comprise the similarity scores. The database may comprise the values representing the position of the blocks. The database may comprise the parameters identified on the blocks of the documents. The database may comprise the relationships approved and rejected by the user.

It is also provided a method for reconstructing a document recorded according to the described method for recording and in which a value representing the position is associated with each directed arc. The method for reconstructing comprises providing a directed graph resulting from the merging. The method for reconstructing comprises selecting the root node associated with the document of the provided graph. The method for reconstructing comprises identifying the blocks of the document by following the directed arcs. The method for reconstructing comprises assembling the identified blocks in the order of the values associated with each directed arc.

The method for reconstructing allows the integrity of the recording to be verified from the reconstruction of the documents. Verifying the integrity of the reconstituted documents relative to the documents as presented before recording allows the integrity of the recording to be verified.

The identifying of the blocks of the document by following the directed arcs may comprise running through a set of paths by following the arcs of the directed graph starting from the arcs connected to the root of the document. A path is a set of one or more successive direct arcs having common nodes allowing the run-through, without interruption, of its outline on the directed graph. The set of paths is determined by evaluating the set of paths that exist from the root of the document toward the blocks by following the branches of the directed graph. Identifying these blocks may comprise identifying a block of the document when a path connects the block and the root of the document by following the orientation of the arcs. The arcs being directed from the root of the document toward the blocks of the document, following the orientation of the arcs allows the blocks belonging to the document to be identified. Identifying the blocks may comprise stopping the run-through of a path when the orientation of an arc on the path is contrary. In fact, a block whose path to the root runs through an arc in the opposite direction cannot belong to the document, given that the orientation of the arc is defined from the root toward the blocks. This allows the evaluated set of paths to be reduced by keeping only the paths leading to a block belonging to the document. For example, considering a relationship established, during the recording, between a block of one document and a block of another document, and that these will then be merged, there will therefore be a first arc directed from the root of the first document toward the merged block, and a second arc directed from the root of the second document toward the merged block. When the path, starting from the root of the first document, reaches the merged block via the first directed arc, the run-through will not continue on a second path, on the second directed arc, the latter then not being directed in the correct direction. Thus, the set of paths will not comprise this second path, as well as the other paths that would have been run through if the run-through had continued via this second arc.

This enhances the precision of the reconstruction. In fact, the evaluation of the set of paths to the blocks guarantees the exhaustiveness of the search from the directed graph of the blocks belonging to the considered document. Thus, the recording and the verification of its integrity are enhanced.

It is also provided av computer program comprising instructions for carrying out the computer-implemented method for recording one or more documents and/or the method for reconstructing a recorded document using a method for recording according to the invention.

It is also provided a computer-readable storage medium on which the computer program is recorded. The storage medium can be a memory or a server.

It is also provided a system comprising a processor coupled to a memory and a graphic user interface. The computer program is recorded on the memory.

Examples of the method will now be given in reference to FIGS. 1 to 7.

FIG. 1 shows an example document. The document has a text comprising three paragraphs 3, 7, 9. The text of the document also comprises two section titles 5, 11. The document advises of a contractual agreement between a first entity ("CODEXO") defined by the characteristics described in paragraph 3 and a second entity ("ACME") defined by the characteristics described in paragraph 7.

FIG. 2 shows an example of dividing into blocks of the document of FIG. 1. The divided document 21 comprises five blocks A, B, C, D and E. The marks used for the division and identified in the document are carriage returns in this example. The carriage returns delimit the five blocks A, B, C, D and E. The blocks A and C comprise the words of the two section titles of the document. The blocks B, D and E comprise the words of the three paragraphs of the document. In particular, the block B reiterates the characteristics of the first entity CODEXO and the block D reiterates the characteristics of the second entity ACME. Thus, the division into blocks allows identification of the structure of the document, here made up of three paragraphs and two section titles. The establishment of the relationships identifies a relationship between the block B and the block D by calculating the distance between each pair of blocks of the blocks of the document. The similarity score between the blocks B and D is significant because they comprise a significant number of similar words. Conversely, the establishment of the relationships does not identify any other relationship between the blocks of the document. A displaying to the user of the link between the blocks B and D then allows approving the identified relationship between the pair of blocks B and D. The determination of the similarity comprises the identification of the parameters on the pair of blocks. The displaying may also include the identification of the parameters found, with rectangles for example like in the display of the block of FIG. 2. Seven parameters a, b, c, d, e, f, g are identified during the determination of the similarity of the blocks B and D. For example, the parameter a assumes the value "CODEXO" in the block B, while it assumes a value "ACME" in the block D. The values of the parameters a, b, c, d, e, f, g are next recorded on the directed arc connecting the root of the document and the block. The parameters are identified from the determination of the similarities of the blocks B and D, which in particular allows extraction of the different words among the similar words between the blocks having a significant similarity.

FIG. 3 shows an example of an elementary directed block of the document of FIG. 1. The elementary directed graph 31 comprises a root node 33 and five nodes 35, 37, 39, 41, 43 that show the five blocks A, B, C, D, E identified during the division of the document of FIG. 1. The elementary directed graph 31 also comprises five directed arcs connecting the root node 33 to the five nodes 35, 37, 39, 41, 43 associated with the five blocks A, B, C, D, E of the document. The elementary directed graph also comprises a value associated with each directed arc representing the position of the block among the other blocks in the divided document. Thus, the value associated with the directed arc 45 connecting the node of the first block A of the document and the root node 33 is 1 ("[order=1]"). Likewise, the value associated with the directed arc 47 connecting the node of the second block B of the document and the root node 33 is 2 ("[order=2]") and so forth for the other directed arcs 49, 51, 53 connecting the nodes of the following successive blocks C, D, E of the document and the root node 33 ("[order=3]", "[order=4]" then "[order=5]"). The parameters identified on the blocks are recorded at the directed arcs connecting the root node of the document and the corresponding blocks. Thus, the parameters "[params1]" of block B are recorded at the directed arc 47 connecting the root node 33 and the node 37 associated with the block B. Likewise, the parameters "[params2]" of the block D are recorded at the directed arc 51 connecting the root node 33 and the node 41 associated with the block D. In this example, the parameters [params1] have the values 55 extracted from the block B and the parameters [params2] have the values 57 extracted from the block D.

Figure 4:
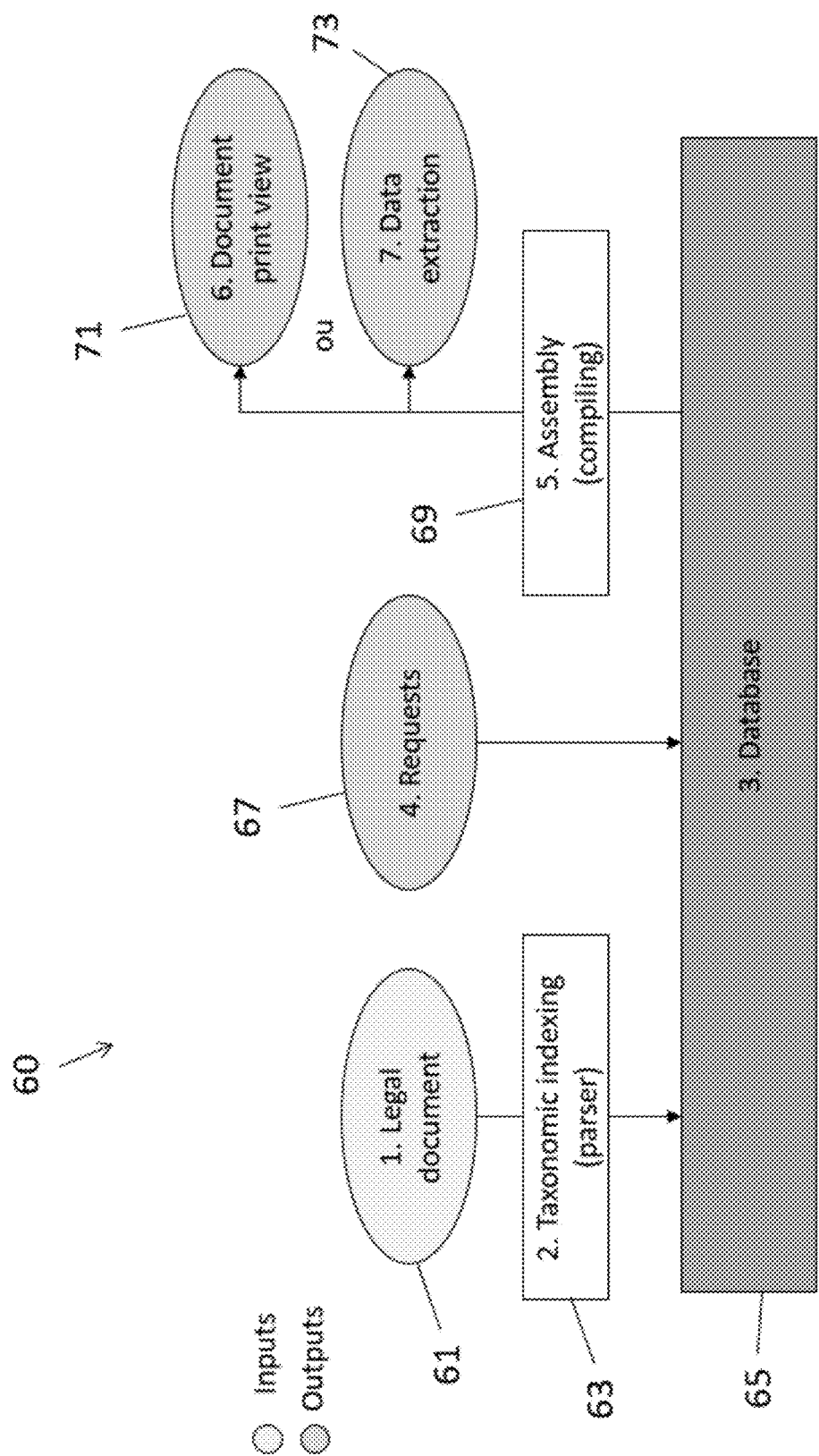
FIG. 4 shows an example architecture of the recording.

FIG. 4 shows an example architecture of the recording and reconstruction of a document recorded according to the method for recording. The architecture of the record 60 comprises, as input, a set of documents 61. The architecture of the record 60 also comprises an indexing module 63 configured to record the set of documents 61 according to the method for recording in blocks according to the invention. The indexing module 63 divides the content of the documents of the set of documents into blocks. The indexing module 63 establishes the relationships between the divided blocks. The indexing module 63 next indexes the blocks in the form of a directed graph. The indexing module 63 allows the division and/or the reconstitution of the set of documents, by converting the content of the documents into a directed graph. The architecture of the record 60 comprises a database 65 comprising recording the blocks of the set of documents 61. In particular, the database 65 comprises the directed graph created by the indexing module 63 during the recording of the set of documents 61. The architecture of the record 60 also comprises a request module 67 configured to make requests of the database. The request is a query of the database whose result is indicated as output, for example to a user. For example, the requests may include requests on the parameters identified on the blocks of the set of documents 61. The architecture of the record 60 also comprises an assembly module 69 configured to reconstitute a document of the set of documents 61 from the database 65 according to the described method for reconstructing. The assembly module 69 allows the selection of the root node associated with the document on the directed graph recorded in the database 65. The assembly module 69 allows identification of the blocks of the document by following the directed arcs of the directed graph. The assembly module 69 allows assembly of the identified blocks in the order of the values associated with each directed arc. The architecture of the record 60 also comprises a viewing module 71 configured to display, as output, the document reconstituted by the assembly module 69, for example to a user. Thus, the viewing module 71 combined with the assembly module 69 make it possible to verify, on consultation of the database 65, and via viewing of the reconstituted document, the integrity of the record of the set of documents 61 in the database 65 according to the described method for recording. The architecture of the record 60 also comprises a data extraction module 73. The data extraction module 73 is in particular configured to extract information on one or more documents reconstituted by the assembly module 69.

Figure 5:
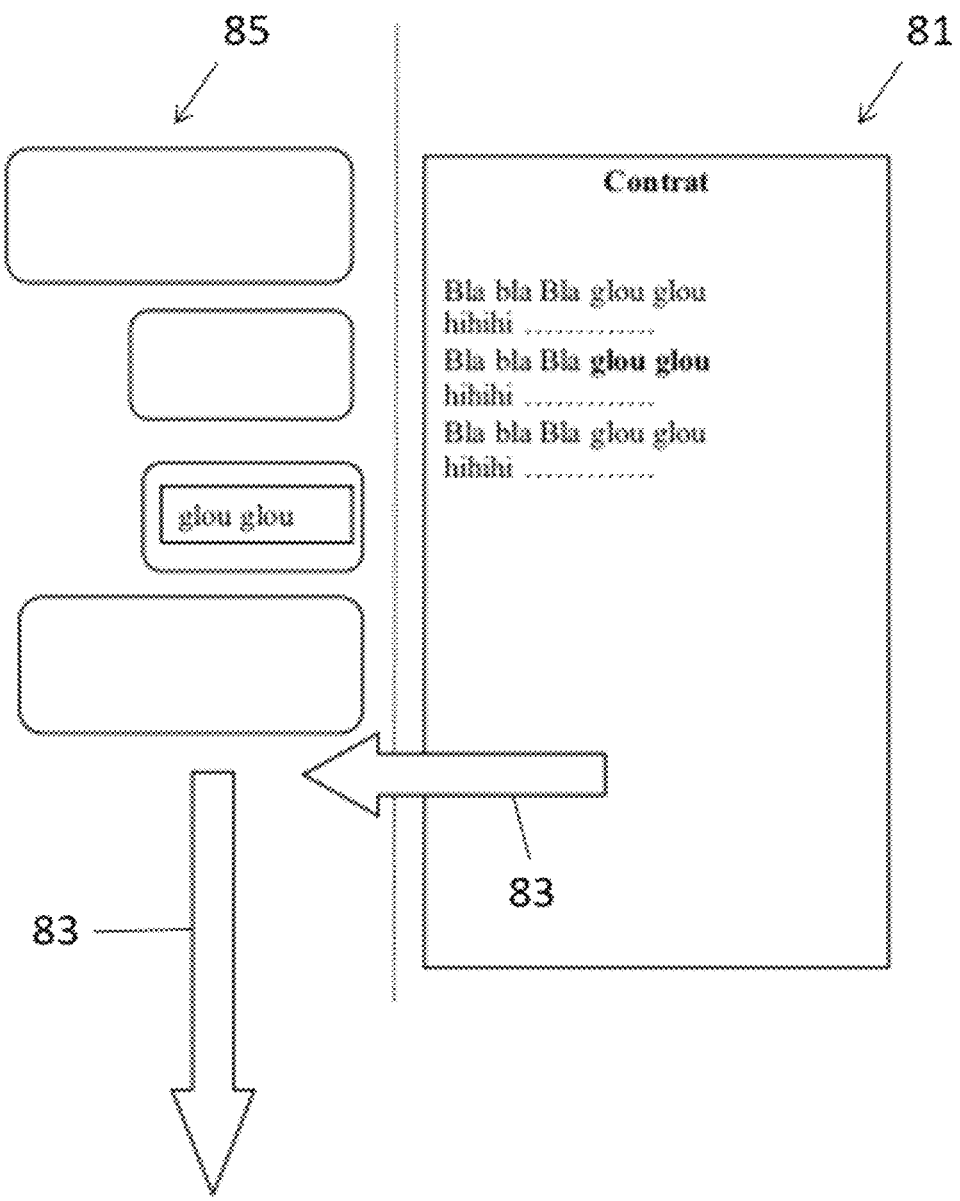
FIG. 5 shows another example of division of a document into blocks.

FIG. 5 shows another example of the dividing of a document into blocks. The document 81 is a document of the technical documentation type comprising words such as the French term "glou." The method for recording comprises a division 83 of the document into a set of blocks 85. One of the blocks of the set in particular comprises the repetition of the word "glou." The blocks are delimited using marks identified in the document. The blocks of the document can then be recorded in a database usable by the method to establish one or more relationships between these blocks and the blocks of other documents.

Figure 6:
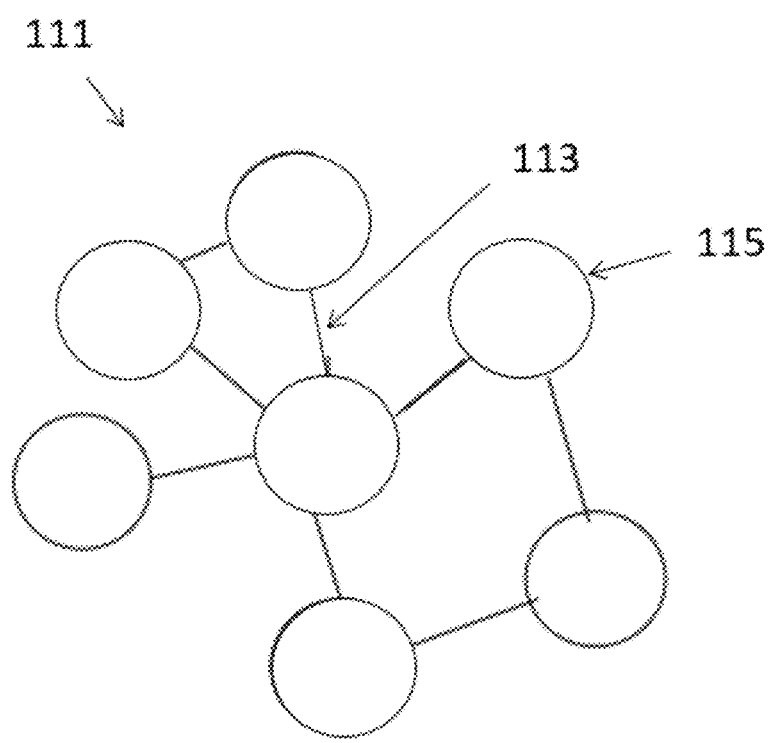
FIG. 6 shows an example of the directed graph.

FIG. 6 shows an example of a directed graph created from the method for recording a set of documents. The directed graph 111 comprises nodes 115. These nodes 115 can be nodes associated with the blocks and root nodes associated with the documents. The directed graph 111 also comprises directed arcs 113 connecting the nodes associated with the blocks with the nodes associated with the documents in which they are present. The directed graph 111 shows how the blocks and the documents are recorded. The directed graph 111 allows viewing of the data of the set of documents according to a representation mode suitable for the extracted data in the contextual format. In this example, the directed graph 111 is a flat representation of the relationships established between the blocks formed after division of the set of documents.

FIG. 7 shows an example of merging of blocks having a high similarity score. In this example, a set of two documents A1 and A2 are provided to the method for recording. The method for recording divides document A1 into a set of blocks Block1, Block2, Block3. Likewise, the method for recording divides document A2 into a set of blocks Block2, Block3, Block4. The method for recording comprises providing elementary directed graphs associated with documents A1 and A2. The elementary graph 92 of document A1 comprises a first root node 91, a node associated with each block identified in the document (Block1, Block2, Block3) and directed arcs connecting the root node 91 to the nodes associated with the blocks of the document (Block1, Block2, Block3). The elementary graph 94 of document A2 comprises a second root node 93, a node associated with each block identified in the document (Block2, Block3, Block4) and directed arcs connecting the root node 93 to the nodes associated with the blocks of the document (Block2, Block3, Block4). The method establishes the relationships between the blocks. To this end, the method calculates a distance between the blocks of each pair of blocks; the distances between all the combinations of blocks are therefore evaluated. The distance evaluates the degree of similarity between the blocks of each pair from words contained in each block. The method for recording therefore establishes a relationship between the blocks Block2 of the documents A1 and A2 and Block3 of documents A1 and A2, the blocks Block2 and Block3 in fact being present in both document A1 and document A2. The pair of blocks Block2 in documents A1 and A2 obtain a high similarity score. Likewise, the pair of blocks Block3 in documents A1 and A2 also obtain a significant similarity score. Creating the directed graph comprises merging the blocks having a high similarity score. Thus, the pair of blocks Block2 is merged into a single block 96. Likewise, the pair of blocks Block3 is merged into a single block 96. The blocks Block2 and Block3 thus merged comprise all the words of the two blocks from which they were merged. It will be understood that if differences exist between the two or more blocks from which a merged block is obtained, the differences can be stored for example by using parameter values, or by storing the read differences in the database storing the blocks. It will be understood that the database is capable of associating different readings that are stored there with the concerned blocks. Thus, the memory space used is reduced because the information contained in the block Block2 (or Block3) is only recorded one time, even though the block Block2 (or Block3) is present in both document A1 and document A2. The record retains only that the block Block2 (or Block3) is present in documents A1 and A2 with the directed arcs of the tree without having to duplicate the information (as was the case during the initial provision of the documents). If differences exist between the two blocks, the record retains only the block Block2 (or Block3) and the differences identified between the two blocks Block2 of A1 and A2. In all cases, the record optimizes the memory space occupied by using the similarities between the documents.

FIG. 8 shows an example of creating of an intermediate node of a directed graph created from the method for recording the set of two documents A1 and A2 of FIG. 7. Creating the directed graph comprises creating an intermediate node 95. Creating the intermediate node 95 comprises identifying a group of blocks with two blocks Block2, Block3 merged between the documents. In this example, the merging of the two blocks Block2, Block3 is identified. The two blocks Block2, Block3 then form a group of blocks with two merged blocks between the documents. Creating the intermediate node 95 comprises creating directed arcs 97, 99 between the intermediate node 95 and each block of the identified group of blocks Block2, Block3. Creating the intermediate node 95 comprises merging the directed arcs 101 of the elementary directed graph of document A1 that are associated with the blocks of the group of blocks Block2, Block3 into a single directed arc 105 connecting the root of the document 91 and the intermediate node 95. Likewise, creating the intermediate node 95 comprises merging the directed arcs 103 of the elementary directed graph of document A2 associated with the blocks of the group of blocks Block2, Block3 into a single directed arc 107 connecting the root of the document 93 and the intermediate node 95. In this example, creating the intermediate node 95 allows identification of the group of similar blocks Block2, Block3 between documents A1 and A2 directly on the created directed graph, thus enhancing recording.

Figure 9:
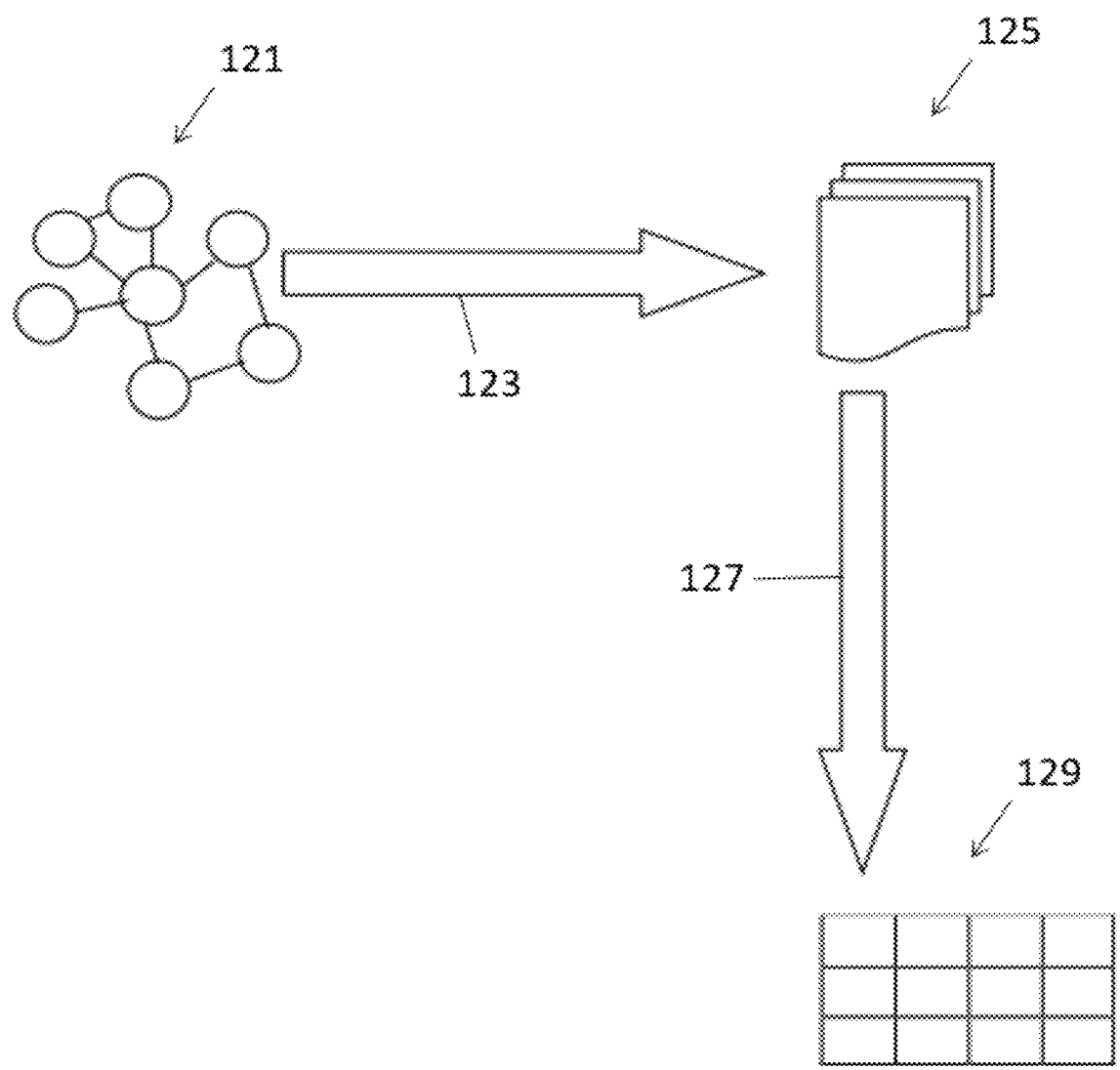
FIG. 9 shows an example of superposition of the data based on the directed graph.

FIG. 9 shows an example of superposition of the data based on the directed graph. The data are the parameters identified on the blocks. The superposition (the arrow 123 shows the superposition step) comprises replacing the identified parameters in the blocks with the appropriate parameter values so as to reconstitute the content of the document. For example, for a block containing the phrase "my name is {name}," the superposition will comprise replacing the parameter {name}=Marc to obtain "my name is Marc" in the reconstituted document. The system is configured to launch a superposition of the data 123 from a directed graph 121 created for a set of documents according to the described method for recording. The superposition of the data 123 allows effective viewing 125 of the data, and in particular of the differences and similarities between the blocks. Thus, at the end of the superposition 123, the system is configured to classify 127 the data. In particular, the data can be classified in a format that is usable by common business management software and according to a traditional database storage mode. The classification 127 of the data is a classification of the values of the parameters identified on the blocks of the set. The classification 127 may comprise a storage and/or comparison of the values of the parameters identified on the blocks. The result 129 of the classification may be shown in the form of a matrix.

The invention claimed is:

1. A computer-implemented method for recording one or more documents, each document comprising at least one word, the method comprising:
   providing one or more documents forming a first set of documents;
   dividing each document of the first set into one or more blocks, each block comprising at least one word;
   establishing one or more relationships between the blocks of documents of the first set;
   creating a directed graph representing the relationships established between the blocks of documents of the first set;
   providing at least one block from a previous division of each document of a second set of documents;
   establishing at least one relationship between the blocks of the documents of the first set and the blocks of the documents of the second set; and
   merging the directed graph created for the first set with another directed graph previously created for the second set and taking account of the at least one established relationship.

2. The method according to claim 1, wherein the dividing of each document of the first or of the second set comprises:
   identifying one or more marks on the document;
   dividing the document into blocks, each block starting from a mark.

3. The method according to claim 2, wherein the marks identified in the document are at least one selection among:
   a section change indicator;
   a carriage return;
   a punctuation mark;

a word;
a space; and
a character.

4. The method according to claim 1, wherein the establishing of the relationships between the blocks comprises, for each pair of blocks:
calculating a distance between the blocks of the pair to determine the similarity between the two blocks.

5. The method according to claim 4, wherein the determining of the similarity further comprises identifying at least one block parameter on the pair of blocks, a parameter representing a different word in the two blocks.

6. The method according to claim 4, wherein the creating of the directed graphs comprises:
providing an elementary directed graph for each document, which elementary directed graph comprises:
a root node associated with the document;
a node associated with each block identified in the document;
a directed arc connecting the root node to each node associated with a block; and
merging blocks having a significant similarity score.

7. The method according to claim 6, wherein the creating of the directed graph further comprises at least one creation of an intermediate node, the creation of an intermediate node comprising:
identifying a group of blocks of at least two merged blocks between at least two documents;
creating directed arcs between the intermediate node and each block of the identified group of blocks; and
for each of the at least two documents, merging the directed arcs of the directed graph of the document that are associated with the blocks of the group of blocks into a single directed arc connecting the root node of the document and the intermediate node.

8. The method according to claim 6, wherein the elementary directed graph of each document further comprises, for each directed arc:
an association of a value representing the position of the block among the other blocks in the divided document.

9. The method according to claim 4, wherein the establishing of one or more relationships between the blocks of the documents of the first or of the second set further comprises approving by a user the relationships, which comprises:
displaying to the user the relationships in an order depending on a similarity score; and
approving or rejecting the link by the user upon each displayed relationship.

10. The method according to claim 1, wherein the establishing of one or more relationships between the blocks of the documents of the first or of the second set further comprises approving by a user of at least one relationship.

11. A method for reconstructing a document recorded according to a method for recording one or more documents, each document comprising at least one word, the method for recording comprising:
providing one or more documents forming a first set of documents;
dividing each document of the first set into one or more blocks, each block comprising at least one word;
establishing one or more relationships between the blocks of documents of the first set;
creating a directed graph representing the relationships established between the blocks of documents of the first set;
providing at least one block from a previous division of each document of a second set of documents;
establishing at least one relationship between the blocks of the documents of the first set and the blocks of the documents of the second set; and
merging the directed graph created for the first set with another directed graph previously created for the second set and taking account of the at least one established relationship,
the method for reconstructing comprising:
providing a directed graph resulting from the merging;
selecting a root node associated with the document of the provided graph;
identifying the blocks of the document following the directed arcs; and
assembling the identified blocks in the order of the values associated with each directed arc.

12. The method for reconstructing according to claim 11, wherein the identifying of the blocks of the document following the directed arcs comprises:
running through a set of paths following the arcs of the directed graph starting from the arcs connected to the root node of the document;
identifying a block of the document when a path connects the block and the root node of the document following the orientation of the arcs; and
stopping the run-through of a path when the orientation of an arc on the path is contrary.

13. A device comprising a data storage medium having recorded thereon a computer program comprising instructions for performing:
a method for recording one or more documents, each document comprising at least one word, the method for recording comprising:
providing one or more documents forming a first set of documents;
dividing each document of the first set into one or more blocks, each block comprising at least one word;
establishing one or more relationships between the blocks of documents of the first set;
creating a directed graph representing the relationships established between the blocks of documents of the first set;
providing at least one block from a previous division of each document of a second set of documents;
establishing at least one relationship between the blocks of the documents of the first set and the blocks of the documents of the second set; and
merging the directed graph created for the first set with another directed graph previously created for the second set and taking account of the at least one established relationship, and
a method for reconstructing a document recorded according to the method for recording, the method for reconstructing comprising:
providing a directed graph resulting from the merging;
selecting a root node associated with the document of the provided graph;
identifying the blocks of the document following the directed arcs; and
assembling the identified blocks in the order of the values associated with each directed arc.

14. The device of claim 13, wherein the dividing of each document of the first or of the second set comprises:
identifying one or more marks on the document; and
dividing the document into blocks, each block starting from a mark.

15. The device of claim 14, wherein the device further comprises a processor coupled to the data storage medium.

16. The device of claim 13, wherein the marks identified in the document are at least one selection among:
- a section change indicator;
- a carriage return;
- a punctuation mark;
- a word;
- a space; and
- a character.

17. The device of claim 16, wherein the device further comprises a processor coupled to the data storage medium.

18. The device of claim 13, wherein the establishing of the relationships between the blocks comprises, for each pair of blocks:
- calculating a distance between the blocks of the pair to determine the similarity between the two blocks.

19. The device of claim 13, wherein the device further comprises a processor coupled to the data storage medium.

\* \* \* \* \*

UNITED STATES PATENT AND TRADEMARK OFFICE
CERTIFICATE OF CORRECTION

PATENT NO. : 11,816,419 B2
APPLICATION NO. : 17/782608
DATED : November 14, 2023
INVENTOR(S) : Sébastien Huppe et al.

It is certified that error appears in the above-identified patent and that said Letters Patent is hereby corrected as shown below:

On the Title Page

(86) PCT No., replace "PCT/HR2020/052288" with -- PCT/FR2020/052288 --.

Signed and Sealed this
Twenty-sixth Day of December, 2023

Katherine Kelly Vidal
*Director of the United States Patent and Trademark Office*